US011061006B2

(12) United States Patent
Ota

(10) Patent No.: US 11,061,006 B2
(45) Date of Patent: Jul. 13, 2021

(54) CHROMATOGRAPH-MASS SPECTROMETRY SYSTEM AND MEASUREMENT CONDITION DISPLAY METHOD

(71) Applicant: JEOL Ltd., Tokyo (JP)

(72) Inventor: Masako Ota, Tokyo (JP)

(73) Assignee: JEOL Ltd., Tokyo (JP)

(*) Notice: Subject to any disclaimer, the term of this patent is extended or adjusted under 35 U.S.C. 154(b) by 287 days.

(21) Appl. No.: 16/429,596

(22) Filed: Jun. 3, 2019

(65) Prior Publication Data
US 2019/0369069 A1  Dec. 5, 2019

(30) Foreign Application Priority Data

Jun. 4, 2018  (JP) .............................. JP2018-106634

(51) Int. Cl.
*G01N 30/86* (2006.01)
*G06F 3/14* (2006.01)
*G09G 5/37* (2006.01)
*G01N 30/72* (2006.01)

(52) U.S. Cl.
CPC ..... *G01N 30/8655* (2013.01); *G01N 30/7206* (2013.01); *G06F 3/14* (2013.01); *G09G 5/37* (2013.01)

(58) Field of Classification Search
None
See application file for complete search history.

(56) References Cited

U.S. PATENT DOCUMENTS

| | | | |
|---|---|---|---|
| 9,823,228 B2* | 11/2017 | Yoshioka | ........... G01N 30/8658 |
| 10,121,643 B2* | 11/2018 | Taneda | ............... G01N 30/8637 |
| 2008/0272292 A1 | 11/2008 | Geromanos et al. | |
| 2013/0240727 A1 | 9/2013 | Sumiyoshi | |
| 2014/0014833 A1 | 1/2014 | Sekiya | |
| 2014/0078182 A1 | 3/2014 | Utsunomiya | |
| 2014/0156203 A1* | 6/2014 | Yamaguchi | ......... H01J 49/0027 702/23 |
| 2016/0180555 A1* | 6/2016 | Matsuo | ................. G06T 11/206 345/440 |
| 2016/0209378 A1* | 7/2016 | Kobayashi | ......... G01N 30/8644 |

(Continued)

FOREIGN PATENT DOCUMENTS

| | | |
|---|---|---|
| JP | H1078421 A | 3/1998 |
| JP | 2007538261 A | 12/2007 |
| JP | 2011058982 A | 3/2011 |

(Continued)

OTHER PUBLICATIONS

Japanese Office Action issued in JP2018-106634 dated Aug. 21, 2020.

*Primary Examiner* — Edward Martello
(74) *Attorney, Agent, or Firm* — The Webb Law Firm

(57) ABSTRACT

A review image is displayed prior to measurement of an analysis target sample. The review image includes a waveform image and a numerical value image showing a measurement condition determined for a measurement segment of interest. The waveform image includes a waveform portion which is a part of a chromatogram, and a marker array showing a period of a circulating ion measurement. The marker array includes a plurality of markers which are displayed in an overlapping manner over the waveform portion.

9 Claims, 11 Drawing Sheets

(56) References Cited

U.S. PATENT DOCUMENTS

2019/0154642 A1    5/2019   Fujito

FOREIGN PATENT DOCUMENTS

| | | |
|---|---|---|
| JP | 2011141220 A | 7/2011 |
| JP | 2012132799 A | 7/2012 |
| JP | 2013224858 A | 10/2013 |
| JP | 201475114 A | 4/2014 |
| WO | 2017175379 A1 | 12/2017 |

* cited by examiner

| COMPOUND | PREDICTED RETENTION TIME (min) | PEAK RANGE (min) | m/z | COMPOUND PERIOD UPPER LIMIT (msec) | ... |
|---|---|---|---|---|---|
| A | 9.5 | 9.0—10.0 | 110,156 | 500 | |
| B | 10.2 | 9.7—10.7 | 132,160 | 800 | |
| C | 10.3 | 9.8—10.8 | 203,215 | 600 | |
| D | 10.6 | 10.1—11.1 | 108,116 | 500 | |
| ... | | | | | |

FIG. 2

| MEASUREMENT SEGMENT (GROUP) | RANGE (min) | COMPOUND | PERIOD UPPER LIMIT (PERIOD UPPER LIMIT FOR EACH GROUP) (msec) | ... |
|---|---|---|---|---|
| 1 | 9.0–9.7 | A | 500 | |
| 2 | 9.7–9.8 | A, B | 500 | |
| 3 | 9.8–10.0 | A, B, C | 500 | |
| 4 | 10.0–10.1 | B, C | 600 | |
| 5 | 10.1–10.7 | B, C, D | 500 | |
| 6 | 10.7–10.8 | C, D | 500 | |
| 7 | 10.9–11.1 | D | 500 | |
| ... | | | | |

FIG. 3

CHROMATOGRAPH-MASS SPECTROMETRY SYSTEM AND MEASUREMENT CONDITION DISPLAY METHOD

CROSS-REFERENCE TO RELATED APPLICATION

This application claims priority to Japanese Patent Application No. 2018-106634 filed Jun. 4, 2018, the disclosure of which is hereby incorporated by reference in its entirety.

BACKGROUND OF THE INVENTION

Field of the Invention

The present disclosure relates to a chromatograph-mass spectrometry system, and in particular to display of a measurement condition.

Description of Related Art

A chromatograph-mass spectrometry system is a system formed as a combination of a chromatograph and a mass spectrometry apparatus. In the chromatograph, located upstream, a plurality of compounds contained in an analysis target sample are separated on a time axis (retention time axis). The plurality of compounds which are separated are sequentially introduced into the mass spectrometry apparatus, located downstream. In the mass spectrometry apparatus, each compound is ionized, and ions generated from each compound are mass spectrometrically analyzed based on a mass-to-charge ratio unique to each ion. As the chromatograph, there are known a gas chromatograph, a liquid chromatograph, and the like. As the mass spectrometry apparatus, there are known a quadrupole type mass spectrometry apparatus, a time-of-flight mass spectrometry apparatus, and the like.

In the chromatograph-mass spectrometry system, when quantitative analysis is executed, prior to measurement of an analysis target sample, a plurality of standard samples having different concentrations are measured, and a calibration curve is generated based on a measurement result. Normally, each of the plurality of compounds contained in the analysis target sample is set as a target of the quantitative analysis. For each standard sample, a sample including these compounds is used. Based on the measurement results of a plurality of standard samples having different concentrations, a plurality of calibration curves corresponding to the plurality of compounds are generated. After an in-advance measurement of the standard sample, measurement of the analysis target sample (main measurement) is executed.

A chromatogram generated by the measurement of the sample includes a plurality of peaks corresponding to the plurality of compounds. Each peak appears at a retention time which is specified in advance for each compound, or at a time close to the retention time. Each peak has a certain width on the retention time axis, and, in order to accurately determine an area of each peak, a peak range (peak observation range) must be determined for each compound. Because a peak center may shift on the retention time axis, the peak range normally includes a certain margin. In the chromatograph-mass spectrometry system, in order to manage the retention time, the peak range, or the like for each compound, a compound condition table is generated.

In a mass spectrometry process, in order to individually measure a plurality of types of ions generated from a plurality of compounds, a plurality of measurement segments (a plurality of groups) are set on the retention time axis, and in each measurement segment, circulating ion measurement is executed. For example, when ions a1 and a2 derived from a compound A and ions b1 and b2 derived from a compound B are to be measured in a certain measurement segment, a measurement sequence for sequentially measuring the four ions in a time divisional manner is repeatedly executed in the measurement segment. In the chromatograph-mass spectrometry system, in order to manage the plurality of measurement segments and to manage ion measurement conditions in units of measurement segments, a measurement condition table is generated.

JP 2012-132799 A discloses a chromatograph-mass spectrometry system having a function to automatically generate the measurement condition table based on the compound condition table.

The substance of the individual measurement condition (ion measurement condition) in the measurement condition table is numerical value information. Even if reference can be made to the numerical value information, it is still difficult to judge whether or not the measurement condition is appropriate, based on the reference to the information. Determination of whether or not the condition of the circulating ion measurement executed in each measurement segment, for example, the number of cycles (the number of measurement points), a cycle time (measurement interval), or the like, is appropriate, is made in relation to a temporal change of an ion amount in the measurement segment. It is desired to graphically express the measurement condition on the chromatogram.

An advantage of the present disclosure lies in precise execution of a review of an ion measurement condition which is set for each measurement segment. Alternatively, an advantage of the present disclosure lies in enabling checking or changing of an ion measurement condition while visually recognizing a relationship between the chromatogram and the ion measurement condition.

SUMMARY OF THE INVENTION

According to one aspect of the present disclosure, there is provided a chromatograph-mass spectrometry system comprising: a storage unit that stores a measurement condition table for managing a plurality of measurement segments which are set on a retention time axis, and a circulating ion measurement executed for each measurement segment; a review image generator that generates, based on the measurement condition table, a review image showing an ion measurement condition which is determined for a measurement segment of interest which is selected from among the plurality of measurement segments; and a display that displays the review image, wherein the review image includes a waveform image, and the waveform image includes a waveform portion in at least the measurement segment of interest of a chromatogram, and a plurality of display elements displayed along with the waveform portion and indicating a circulating ion measurement executed in the measurement segment of interest.

According to the above-described structure, because the plurality of display elements are displayed along with the waveform portion, the appropriateness of the circulating ion measurement can be judged by a comparative observation of the waveform portion and the display elements. For example, it is possible to easily judge, in relation to a specific form of the waveform portion and based on an arrangement of the plurality of display elements, whether the number of circulating ion measurements is appropriate or inappropriate (whether the number is too small or too large).

The plurality of display elements may indicate the number of measurements or a measurement interval in units of compounds in the measurement segment of interest, or may indicate the number of measurements or a measurement interval in units of ions in the measurement segment of interest. In the case of the latter, an interval between two adjacent display elements corresponds to an accumulation period. Each display element is a marker, and may be formed from, for example, a geometric figure such as a point, a line, or the like.

According to another aspect of the present disclosure, the review image generator changes an arrangement of the plurality of display elements when an ion measurement condition determined for the measurement segment of interest is changed. With this structure, it becomes possible to change the ion measurement condition while observing the plurality of display elements, which change in real time. The review image is an image for performing review (check, change) of the ion measurement condition.

According to another aspect of the present disclosure, the review image includes a numerical value image, and the numerical value image includes numerical value information indicating the number of cycles of the circulating ion measurement, numerical value information indicating a cycle time of the circulating ion measurement, and numerical value information indicating an accumulation time forming a measurement unit in the circulating ion measurement. According to this structure, it becomes possible to comprehensively judge the appropriateness of the ion measurement condition through observation of the waveform image and the numerical value image. Alternatively, a part or all of the ion measurement condition may be changed by the user through the numerical value image. In this case, the numerical value image functions as a user interface for changing the ion measurement condition.

According to another aspect of the present disclosure, the numerical value image includes a column in which a user designates the number of cycles. The number of cycles is the number of periods in the measurement segment of interest; in other words, is the number of measurements for each ion in the measurement segment of interest. In either of a case where all or a part of the ion measurement conditions is manually designated and a case where all or a part of the ion measurement conditions is automatically determined, with the display of the waveform image, it becomes possible to accurately judge the appropriateness of the designated or set ion measurement condition, in relation to the specific waveform.

According to another aspect of the present disclosure, the chromatograph-mass spectrometry system further comprises a determiner that determines a part or all of the number of cycles, the cycle time, and the accumulation time so that a cycle-number condition, a cycle time condition, and an accumulation time condition are satisfied, and a determination result of the determiner is reflected in the numerical value image. For example, as the cycle-number condition, a lower limit, or an upper limit and a lower limit, of the number of cycles in the measurement segment of interest is/are determined. As the cycle time condition, an upper limit of the cycle time is determined. As the accumulation time condition, a lower limit of the accumulation time is determined. The individual condition may be varied by a measurement mode or the like.

According to another aspect of the present disclosure, the determiner includes: a means which determines a plurality of ion measurement condition candidates which satisfy three conditions including the cycle-number condition, the cycle time condition, and the accumulation time condition; and a means which determines a particular ion measurement condition candidate as an ion measurement condition by evaluating the plurality of ion measurement condition candidates. According to this structure, a particular ion measurement condition candidate is narrowed down from among a plurality of ion measurement condition candidates. Alternatively, a plurality of ion measurement condition candidates may be determined by setting different conditions to be prioritized among the three conditions. Alternatively, a plurality of evaluation methods may be prepared, and a particular ion measurement condition candidate may be selected according to a selected evaluation method. When it is difficult to determine an ion measurement condition satisfying the three conditions, an error process may be executed.

According to another aspect of the present disclosure, the chromatogram is a standard sample chromatogram acquired by measurement of a standard sample, and measurement of an analysis target sample is executed after checking and changing the ion measurement condition through observation of the review image. Desirably, as the chromatogram, a chromatogram acquired by an immediately previous standard sample measurement is used. There may also be considered use of the chromatogram or the like which is acquired by the standard sample measurement of a further past, or an analysis target sample measurement of a further past.

According to another aspect of the present disclosure, there is provided a method of displaying a measurement condition, comprising: generating, based on a measurement condition table for managing a plurality of measurement segments which are set on a retention time axis, and a circulating ion measurement executed for each measurement segment, a review image for checking and changing an ion measurement condition which is determined for a measurement segment of interest which is selected from among the plurality of measurement segments; and displaying the review image, wherein the review image includes a waveform image and a numerical value image, the waveform image includes a waveform portion in at least the measurement segment of interest of a chromatograph, and a plurality of display elements displayed along with the waveform portion and indicating a circulating ion measurement executed in the measurement segment of interest, and the numerical value image includes at least one of numerical value information indicating the number of cycles of the circulating ion measurement, numerical value information indicating a cycle time of the circulating ion measurement, and numerical value information indicating an accumulation time forming a measurement unit in the circulating ion measurement.

The above-described method may be realized as a function of hardware or a function of software. In the latter case, a program which executes the above-described method is installed to an information processor apparatus via a network or via a transportable recording medium. The information processor apparatus is a concept including various devices such as a gas chromatograph-mass spectrometry system, a control device thereof, a mass spectrometry apparatus, a computer, and the like.

BRIEF DESCRIPTION OF THE DRAWINGS

Embodiment(s) of the present disclosure will be described by reference to the following figures, wherein:

FIG. 2 is a diagram showing an example of a compound condition table;

FIG. 3 is a diagram showing an example of a measurement condition table;

DESCRIPTION OF THE INVENTION

An embodiment of the present disclosure will now be described with reference to the drawings.

Figure 1:
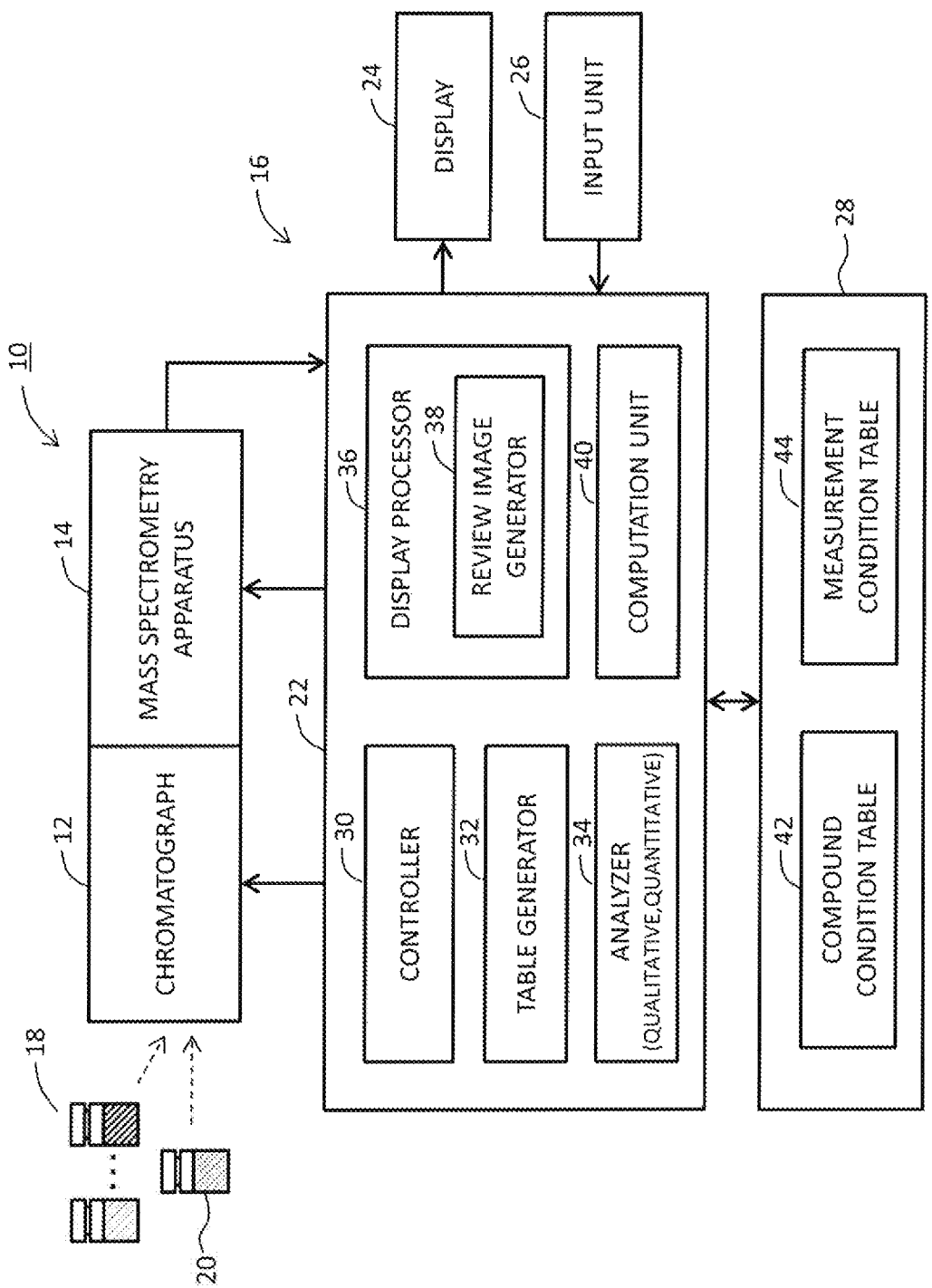
FIG. 1 is a block diagram showing a chromatograph-mass spectrometry system according to an embodiment of the present disclosure.

FIG. 1 shows a chromatograph-mass spectrometry system according to an embodiment of the present disclosure. A chromatograph-mass spectrometry system 10 shown in the figure is used in a qualitative analysis and a quantitative analysis of an analysis target sample 20. In the example structure shown in the figure, the chromatograph-mass spectrometry system 10 comprises a chromatograph 12, a mass spectrometry apparatus 14, and a computation control apparatus 16. Alternatively, the computation control apparatus 16 may be incorporated in the chromatograph 12 or the mass spectrometry apparatus 14.

The chromatograph 12 at the upstream is, for example, a gas chromatograph. The gas chromatograph comprises, for example, a carrier gas introduction unit, a sample introduction unit, a gasification chamber, a separation column, a discharge unit, and the like. In the chromatograph 12, a plurality of compounds included in the analysis target sample 20 are separated on a time axis (retention time axis). The plurality of separated compounds are sequentially introduced to the mass spectrometry apparatus 14. Alternatively, a liquid chromatograph or the like may be provided in place of the gas chromatograph.

In general, prior to the quantitative analysis of the analysis target sample 20, a plurality of standard samples (standard sample set) 18 having different concentrations are measured. Each standard sample includes a plurality of analysis target compounds. Based on measurement results of the plurality of standard samples 18, a calibration curve for specifying the concentration of the compound is determined for each analysis target compound. The calibration curve shows a relationship between the concentration and a peak instruction value (peak area or peak height). For the judgment that the peak corresponds to a target substance, there may be used a ratio between the peak instruction value of the quantitative ion and the peak instruction value of a confirmation ion (I/Q).

The mass spectrometry apparatus 14 located downstream is, for example, a quadrupole mass spectrometry apparatus. In the mass spectrometry apparatus 14, each compound which is introduced from the chromatograph 12 is ionized, a plurality of ions thus generated are separated or extracted according to a mass-to-charge ratio of each ion, and the individual ions are detected. Based on a detection signal thereof, a chromatogram, a mass spectrum, or the like is generated. A processing of the detection signal may be executed by the mass spectrometry apparatus 14, but in the example structure shown in the figure, the detection signal is processed by the computation control apparatus 16.

In the present embodiment, the mass spectrometry apparatus 14 is specifically a tandem quadrupole mass spectrometry apparatus. The tandem quadrupole mass spectrometry apparatus comprises a quadrupole mass spectrometry unit which functions as a first mass filter, a collision cell, and a quadrupole mass spectrometry unit which functions as a second mass filter. The mass spectrometry apparatus of such a type includes measurement modes such as a scan mode (Scan), an SIM (Selected Ion Monitoring) mode, an SRM (Selected Reaction Monitoring) mode, and the like. In the scan mode, scanning of a mass-to-charge ratio (m/z) is repeatedly executed, and a mass spectrum is sequentially acquired. In the SIM mode, for example, a plurality of particular ions are set as detection targets, and a measurement sequence for sequentially measuring these ions in a time divisional manner is repeatedly executed. In other words, a circulating ion measurement is executed. In the SRM mode, for example, a combination of a precursor ion and a product ion is set as a detection target. A measurement sequence for sequentially measuring a plurality of combinations in a time divisional manner is repeatedly executed. In other words, in this case also, a circulating ion measurement is executed. Alternatively, as the mass spectrometry apparatus 14, a mass spectrometry apparatus of another type may be provided.

In order to operate the mass spectrometry apparatus 14 in the operation modes such as the SIM mode and the SRM mode, a compound condition table and a measurement condition table are provided in the mass spectrometry apparatus 14 or in the computation control apparatus 16. In the present embodiment, a compound condition table 42 and a measurement condition table 44 are provided in the computation control apparatus 16. These tables will be described later in detail.

The computation control apparatus 16 is formed from an information processor apparatus such as, for example, a PC. The computation control apparatus 16 has a system control function, a data computation function, a display processing function, or the like. In order to execute these functions, the computation control apparatus 16 has a main body 22, a display 24, an input unit 26, and a storage unit 28. The substance of the main body 22 is a CPU and an operation program.

In FIG. 1, a plurality of representative functions of the main body 22 are represented by a plurality of blocks. The display 24 is formed from an LCD (liquid crystal display), an organic EL (organic electro-luminescence) device, or the like. On a screen of the display 24, a chromatogram, a mass spectrum, a review image to be described later, and the like are displayed. The input unit 26 is formed from a keyboard, a pointing device, or the like. Using the input unit 26, a user sets a measurement condition or changes the measurement condition. The storage unit 28 is formed from a semiconductor memory, a hard disk drive, or the like. The storage unit 28 stores the compound condition table 42 and the measurement condition table 44.

In the main body 22, a controller 30 functions as a system controller, and controls operations of the chromatograph 12 and the mass spectrometry apparatus 14. A table generator 32 generates the compound condition table 42 and the measurement condition table 44. In the present embodiment, the table generator 32 has a function to automatically generate the measurement condition table 44 based on the compound condition table 42. An analyzer 34 executes a qualitative analysis (or qualitative analytical study) by, for example, a mass spectrum analysis, and also executes a quantitative analysis (or quantitative analytical study) based on measurement data (in particular, the peak for each compound) acquired in the SIM mode or the SRM mode. The analyzer 34 generates a calibration curve (data showing a relationship between the concentration and the peak area) for each analysis target based on standard sample measurement results prior to the quantitative analysis, and holds the data. A display processor 36 has a chromatogram generation function, a mass spectrum generation function, a graphic image generation function, an image combining function, a color processing function, or the like.

In the present embodiment, the display processor 36 has a review image generation function, and this function is represented as a review image generator 38 in FIG. 1. In the present embodiment, a review image is an image which is displayed for checking a measurement condition (ion measurement condition) for each measurement segment determined on the retention time axis after the measurement of the standard sample and before the measurement of the analysis target sample, and for changing the measurement condition as necessary. A computation unit 40 has a function to compute a measurement condition, a function to compute a measurement condition candidate, a function to determine a measurement condition, or the like.

FIG. 2 shows the compound condition table 42. The compound condition table 42 is generated prior to the quantitative analysis. The compound condition table 42 includes a plurality of records 50. Each record 50 includes information such as an identifier of the compound to be measured (compound name), a predicted retention time, a peak range serving as a time range for area computation, a mass-to-charge ratio of the measurement target ion, and the like. Further, in the present embodiment, each record 50 includes a period upper limit. The period upper limit is an upper limit of a period (cycle time) of the circulating ion measurement. Specifically, for the ion measurement of a certain compound, the measurement condition is determined such that the period of the circulating ion measurement does not exceed the period upper limit correlated to the compound. Additionally, a lower limit of the accumulation time, a lower limit of the number of cycles in the circulating ion measurement, or the like may be managed in the compound condition table 42.

The predicted retention time is a time when appearance of a peak corresponding to the compound is expected, and more specifically is a time when appearance of a peak center is expected. A peak range is a range on the retention time axis for observing the peak of the compound, and a range where the computation of the peak area is executed is defined by the peak range. In order to handle a shift of the peak center which may actually occur, normally, the peak range includes a certain margin. In the quantitative analysis of the compound, normally, ions of two or more types are measured for each compound. For example, quantitative ions and confirmation ions are measured. Mass-to-charge ratios of these ions are managed in the compound condition table 42. The numerical values described in the specification and shown on the drawings of the present disclosure are merely exemplary.

FIG. 3 shows the measurement condition table 44. Similar to the compound condition table described above, the measurement condition table 44 is generated prior to the quantitative analysis. In the present embodiment, the measurement condition table 44 is generated along with the compound condition table prior to the standard sample measurement. The measurement condition table 44 includes a plurality of records 52. Each record 52 includes information such as an identifier of a measurement segment (group), a temporal range, an identifier of a compound, the period upper limit, a plurality of mass-to-charge ratios, and the like. There is an overlap in the plurality of peak ranges defined in the compound condition table. For example, a plurality of measurement segments arranged on the retention time axis are automatically determined under a condition to determine the measurement segment for each change or each form of the overlap. In addition, the measurement condition is automatically computed for each measurement segment according to the number of analysis target ions, and other conditions. Alternatively, the plurality of measurement segments and the measurement condition for each measurement segment may be manually designated by the user.

In the measurement condition table 44, the period upper limit (upper limit of cycle time) is determined for each measurement segment. For example, reference is made to one or a plurality of period upper limits determined for one or a plurality of compounds for each measurement segment, a shortest period upper limit among the period upper limits is specified, and is registered in the measurement condition table 44. In the measurement condition table 44, for each measurement segment, in addition to the period condition, a measurement mode, an accumulation time lower limit, and the like are managed. Alternatively, for the SIM mode and the SRM mode, measurement condition tables dedicated to these modes may be respectively generated.

According to a content of the measurement condition table 44, for each measurement segment, a measurement condition for the circulating ion measurement is set. Specifically, the number of cycles (the number of measurements per ion), a cycle time (period), an accumulation time (ion detection time forming a measurement unit), and the like are determined for the circulating ion measurement. This will be described below with reference to FIG. 4.

Figure 4:
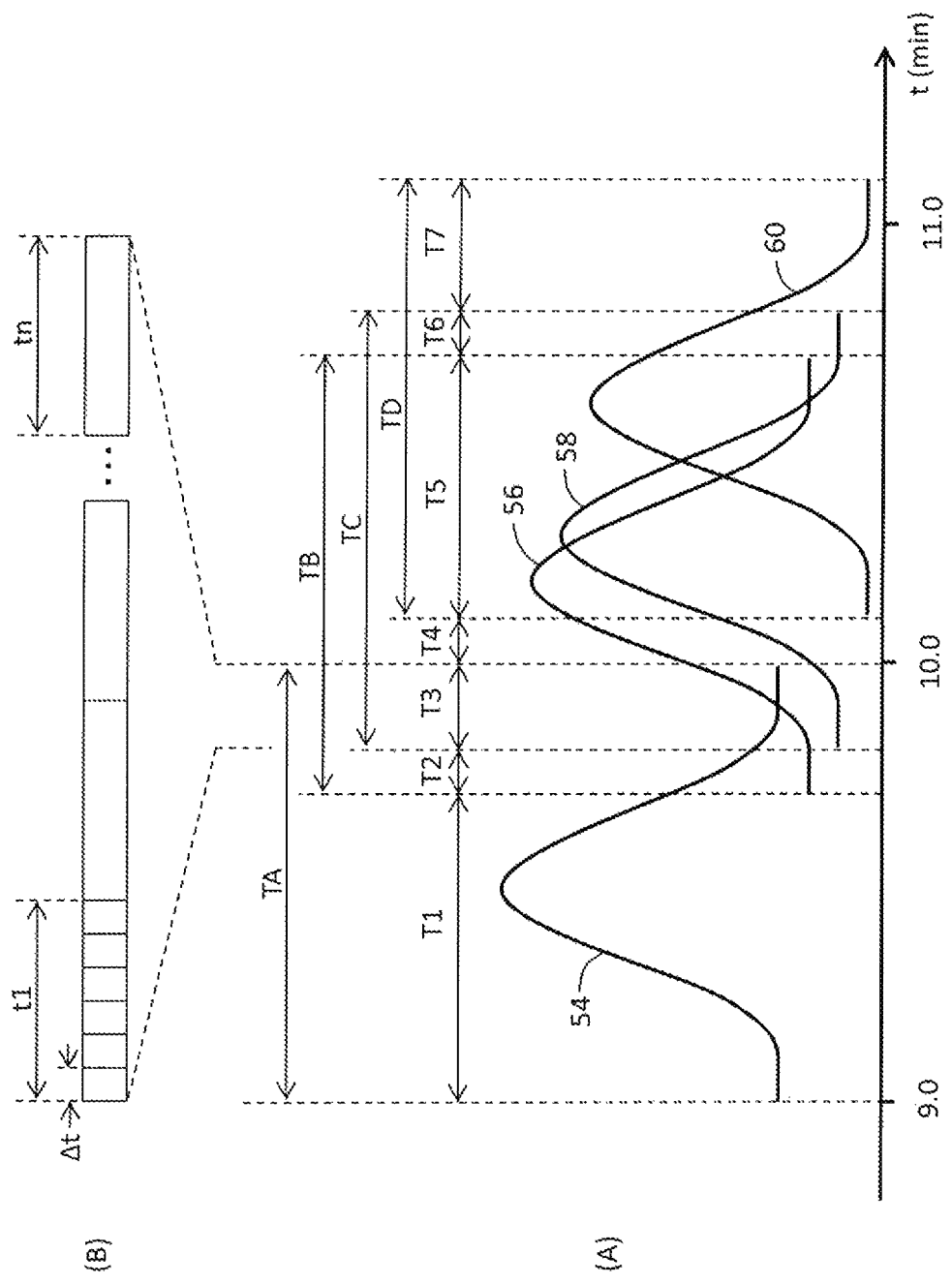
FIG. 4 is a diagram showing a plurality of measurement segments.

In FIG. 4, (A) shows a plurality of peaks (compound peaks) 54~60 corresponding to a plurality of compounds A~D (refer to FIGS. 2 and 3). These peaks 54~60 are waveform portions serving as a part or a component of a chromatogram (for example, a total ion current chromatogram). In order to improve visibility of the plurality of peaks 54~60, the positions thereof are shifted in a vertical axis direction. A horizontal axis direction is a time axis; that is, the retention time axis. Each peak 54~60 is schematically represented, exaggerated in the time axis direction. Normally, because a plurality of types of ions having different mass-to-charge ratios are measured for each compound, a plurality of peaks are generated for each compound, when viewed in units of ions. However, FIG. 4 only shows a single peak for each compound.

In the compound condition table, a peak range is determined for each of the plurality of peaks 54~60, which are shown in FIG. 4 as TA~TD. An overlap occurs between the plurality of peak ranges TA~TD. In correspondence to the plurality of overlap forms, a plurality of measurement segments T1~T7 are determined. There segments are arranged on a line on the time axis.

For example, a measurement segment T3 corresponds to an overlap portion of three peak ranges TA, TB, and TC. In the measurement segment T3, as shown by (B), for example, a measurement sequence including a sequence of ion measurements is repeatedly executed n times. Here, n is the number of the circulating ion measurements; that is, the number of cycles. A time length of each measurement sequence is shown in FIG. 4 as t1~tn. One measurement sequence includes, for example, 6 ion measurements for quantitatively analyzing three compounds. That is, 6 ion measurements are sequentially executed in a time divisional manner. A time width of each ion measurement in this case is shown by Δt. The time width is a measurement unit, and corresponds to the accumulation period. A detection signal of a particular ion is read in the time width Δt, and is accumulated. The accumulated value is set as an ion content at a particular timing. A measurement interval (cycle time, period) for each ion is t1 (=t2, . . . , =tn).

In the present embodiment, a review image is displayed after the measurement of the standard sample (in-advance measurement), and prior to the measurement of the measurement target sample (main measurement), individual measurement conditions are checked on the review image, and the individual measurement conditions may be changed as necessary. These will now be described in detail.

Figure 5:
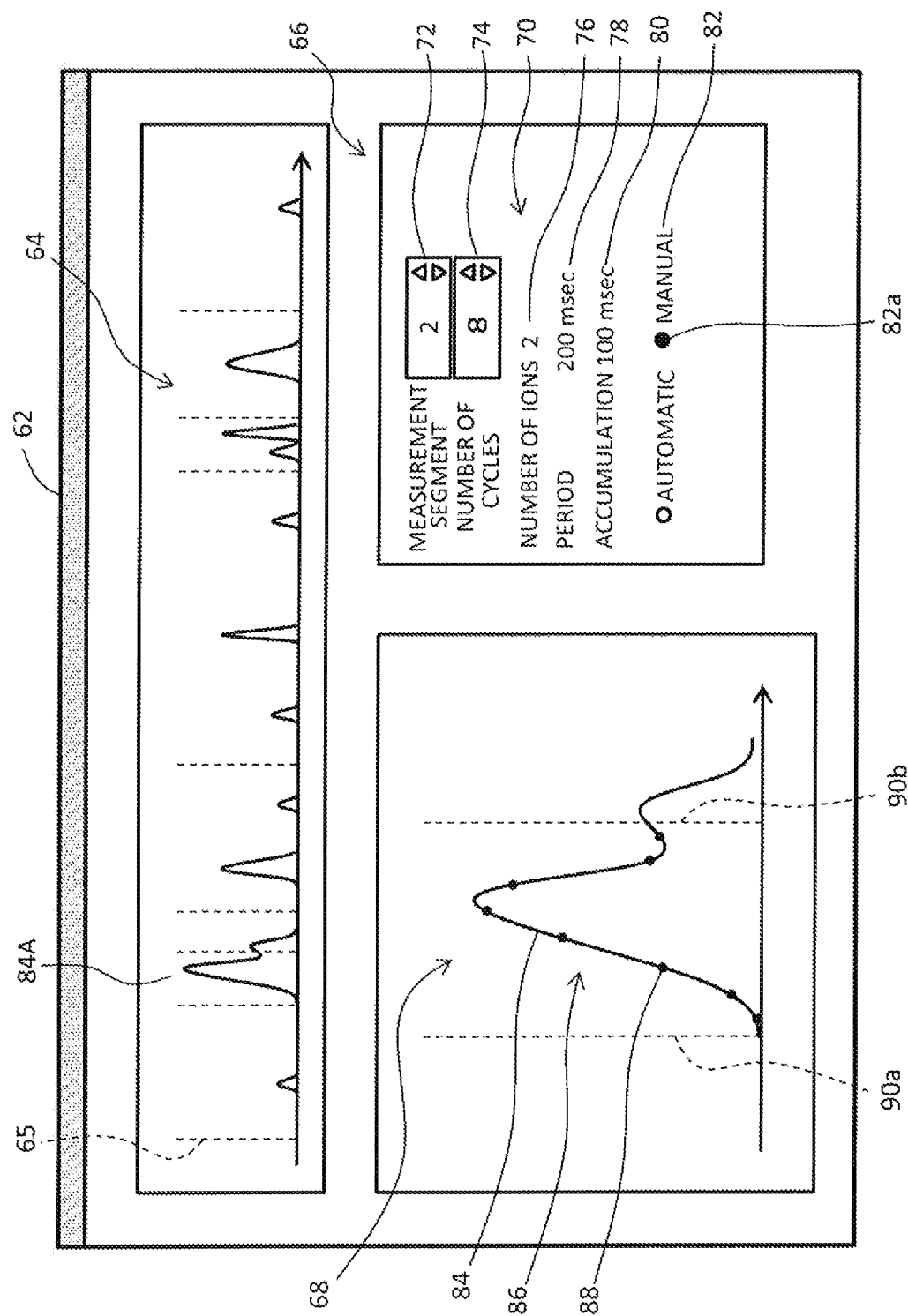
FIG. 5 is a diagram showing a first example display according to an embodiment of the present disclosure.

FIG. 5 shows a first example display. On a display screen 62 of the display, a chromatogram 64 is displayed, and a review image 66 is displayed. The chromatogram 64 is acquired by the measurement of the standard sample, and is, for example, a chromatogram for the standard sample of the highest concentration (total ion current chromatogram). Such a chromatogram may be generated as a result of execution of the scan mode, the SIM mode, the SRM mode, or the like. Alternatively, in the in-advance measurement, an operation mode identical to the operation mode selected in the main measurement may be selected. The chromatogram 64 includes a plurality of lines 65 showing a plurality of measurement segments.

In the present embodiment, the review image 66 includes a waveform image 68 and a numerical value image 70. The latter, that is, the numerical value image 70, is an image for checking, as numerical value information, a measurement condition for a measurement segment selected by the user (measurement segment of interest), and for changing the measurement condition as necessary. The numerical value image 70 includes a designation column 72. By a user's operation with respect to the designation column 72, a number showing the measurement segment of interest is designated (selected). When the measurement segment of interest is designated, the measurement condition determined for the measurement segment of interest is displayed on the waveform image 68 and the numerical value image 70. Alternatively, the measurement segment of interest may be identified and displayed in the chromatogram 64.

In the numerical value image 70, a designation column 74 is a column for the user to designate the number of cycles (number of circulating ion measurements) in a state where a manual setting mode is selected. In the structure exemplified in the figure, the number of "8" is designated as the number of cycles. The numerical value image 70 also includes information 76 indicating the number of measurement target ions, information 78 indicating the period (cycle time), and information 80 indicating the accumulation time. In addition, the numerical value image 70 includes a selection column 82 for selecting one mode from the manual setting mode and an automatic setting mode. In the example structure shown in FIG. 5, the manual setting mode is selected (refer to reference numeral 82a).

By referring to the numerical value image 70, it becomes possible to check the measurement condition as the numerical value information, and the number of cycles may be changed on the numerical value image 70 as necessary. However, it is difficult to judge, from the numerical value information alone, whether or not the measurement condition; in particular, the number of cycles, is appropriate, in relation to the actual peak. In consideration of this, in the present embodiment, the waveform image 68 is displayed along with the numerical value image 70.

In the structure shown in the figure, the waveform image 68 is displayed on the same screen as and alongside the numerical value image 70. The waveform image 68 includes a waveform portion 84 indicating peaks in the measurement segment of interest, and a marker array 86 indicating the number of cycles or the cycle time. The waveform portion 84 is a portion over at least the entirety of the measurement segment of interest, and, in the structure shown in the figure, is a portion cut out from the chromatogram 64. In reality, the portion is enlarged in the horizontal axis direction and in the vertical axis direction, and thus, the waveform image 68 is an enlarged image. Alternatively, the sizes in the horizontal axis direction and in the vertical axis direction of the waveform portion may be automatically adjusted according to the size of the waveform portion to be displayed and in consideration of a size of a window of the waveform image 68. Alternatively, the displayed waveform portion 84 may include a portion exceeding the measurement segment of interest. For example, the waveform portion 84 may be displayed over a plurality of measurement segments.

The marker array 86 includes a plurality of markers 88 indicating the number of repetitions of the measurement sequence; that is, the number of cycles, in the measurement segment of interest. In the example structure shown in the figure, each marker 88 is a point, which is a display element. Each marker 88 is displayed, for example, at a center position in each cycle period on the time axis, and is also displayed in an overlapping manner over the waveform portion 84. Vertical lines 90a and 90b are a pair of display elements showing respective ends of the measurement segment of interest. A portion between the vertical lines 90a and 90b corresponds to a time length of the measurement segment of interest.

By referring to the plurality of markers 88, it becomes possible to easily judge whether or not the number of measurement points or a spacing between the measurement points is appropriate in relation to the actual waveform. For example, when it is desired to shorten the spacing between the measurement points in relation to the waveform, the number of cycles may be increased. When the number of cycles is changed, the content of the change is reflected in real time in the waveform image 68 and in the numerical value image 70. In other words, the arrangement of the plurality of markers 88 of the marker array 86 is changed, and the contents of the numerical value information included in the numerical value image 70 are changed.

The measurement segment of interest is sequentially selected, the measurement condition is checked based on the review image 66 displayed every time the segment is selected, and the measurement condition is changed as necessary. Then, according to the plurality of measurement conditions after the change, measurement of the measurement target sample is executed, and the analysis target sample is quantitatively analyzed based on the measurement result.

When the change of the number of cycles results in a situation in which either of the cycle time condition (period condition) and the accumulation period condition is no longer satisfied, an error process is executed. For example, in the error process, a screen asking the user to set the change of the measurement condition valid or invalid is displayed in a popped-up manner.

Figure 6:
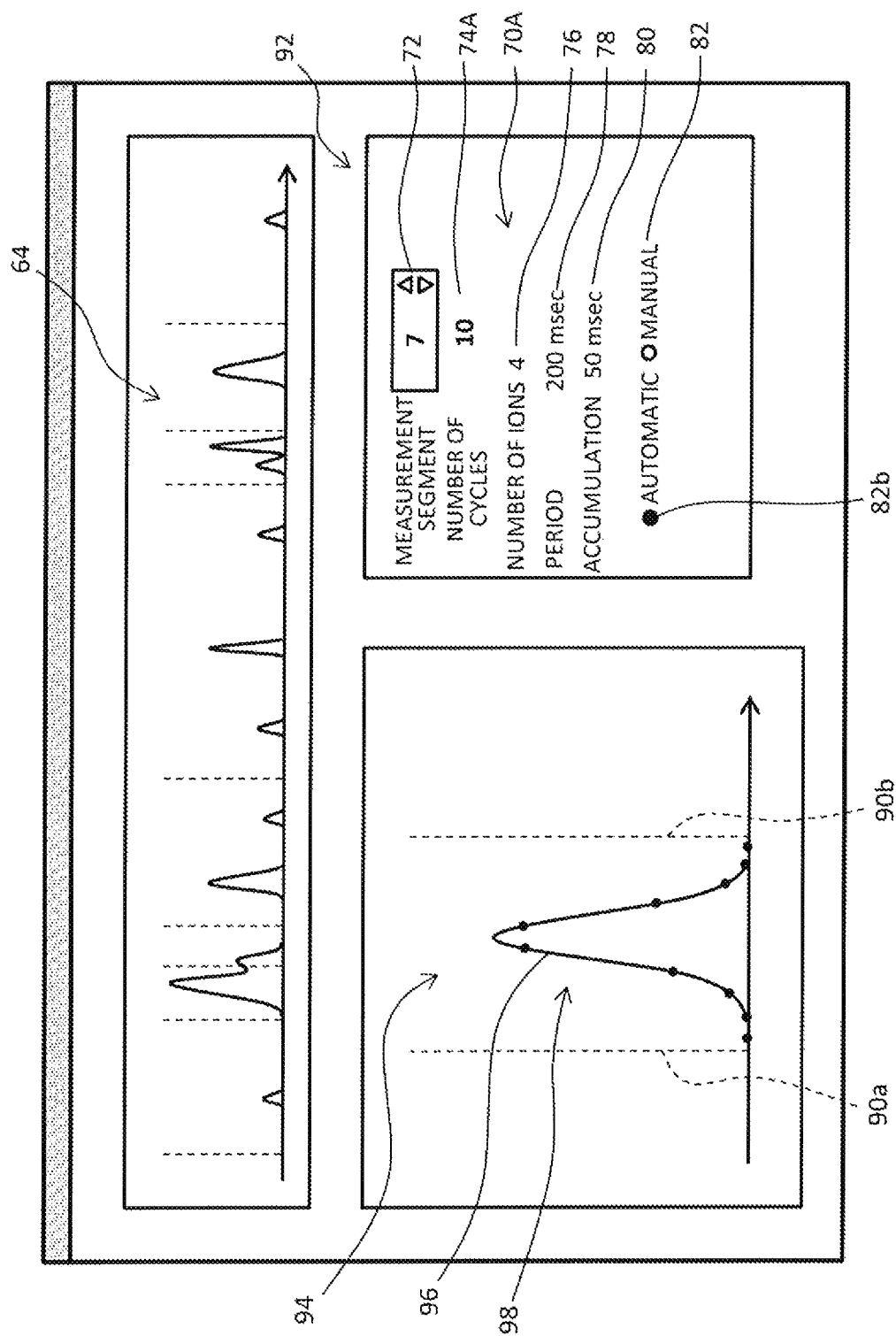
FIG. 6 is a diagram showing a second example display according to an embodiment of the present disclosure.

FIG. 6 shows a second example display. This display is displayed when the automatic setting mode is selected. Elements similar to the elements shown in FIG. 5 are assigned the same reference numerals and will not be described again. This is similarly true for FIGS. 7 and 8 to be described later.

In FIG. 6, a review image 92 includes a waveform image 94 and a numerical value image 70A. In the numerical value image 70A, a button 82b in the selection column 82 is selected; that is, the automatic setting mode is selected. In this case, the measurement condition is automatically computed for the measurement segment of interest designated in the designation column 72. That is, a measurement condition automatically computed based on the compound condition table or manually designated is automatically corrected. In this case, as will be described later in detail, a particular measurement condition is automatically computed which satisfies the three conditions including the cycle-number condition, the cycle time condition, and the accumulation condition. A result of the computation is reflected in the numerical value image 70A and in the waveform image 94. In the numerical value image 70A, a numerical value which is automatically computed is displayed as the number of cycles 74A. Similar to the first example display, the waveform image 94 includes a waveform portion 96 cut out from the chromatogram, and a marker array 98 which is displayed overlapping the waveform portion 96.

Figure 7:
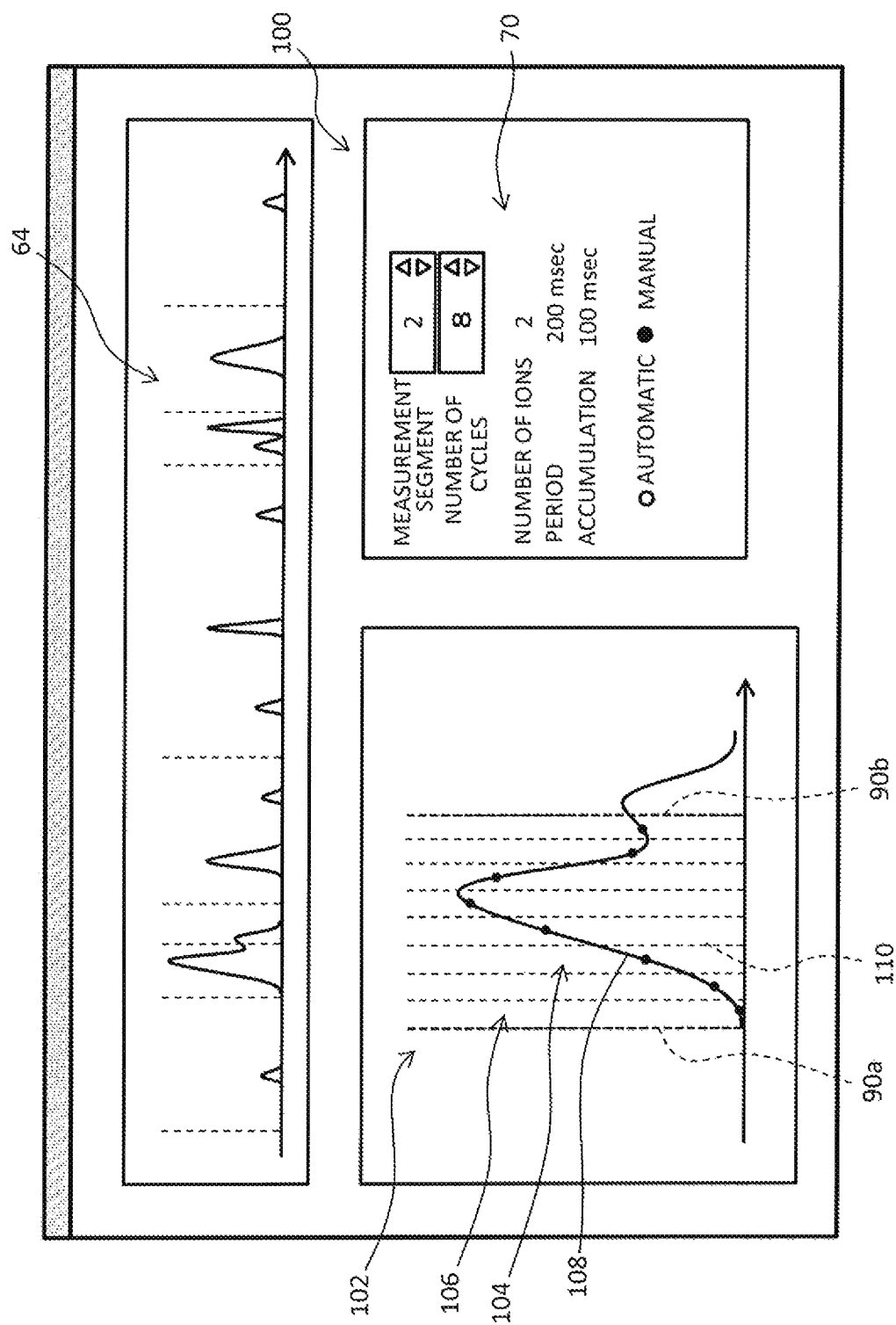
FIG. 7 is a diagram showing a third example display according to an embodiment of the present disclosure.

FIG. 7 shows a third example display. A review image 100 includes a waveform image 102 and the numerical value image 70. The waveform image 102 includes a partial waveform 108, a first marker array 104, and a second marker array 106. The first marker array 104 includes a plurality of points displayed in an overlapping manner over the partial waveform 108, and the second marker array 106 includes a plurality of vertical lines 110. The plurality of vertical lines 110 function as a plurality of markers indicating a plurality of cycles (more specifically, respective ends of each cycle). An individual line 110 corresponds to the marker which is a display element. The plurality of vertical lines 110 also includes two lines (vertical markers) 90a and 90b indicating respective ends of the measurement segment of interest. Each point of the first marker array is displayed at an intermediate position of each cycle. Alternatively, it may be the case that only the second marker array 106 is displayed.

Figure 8:
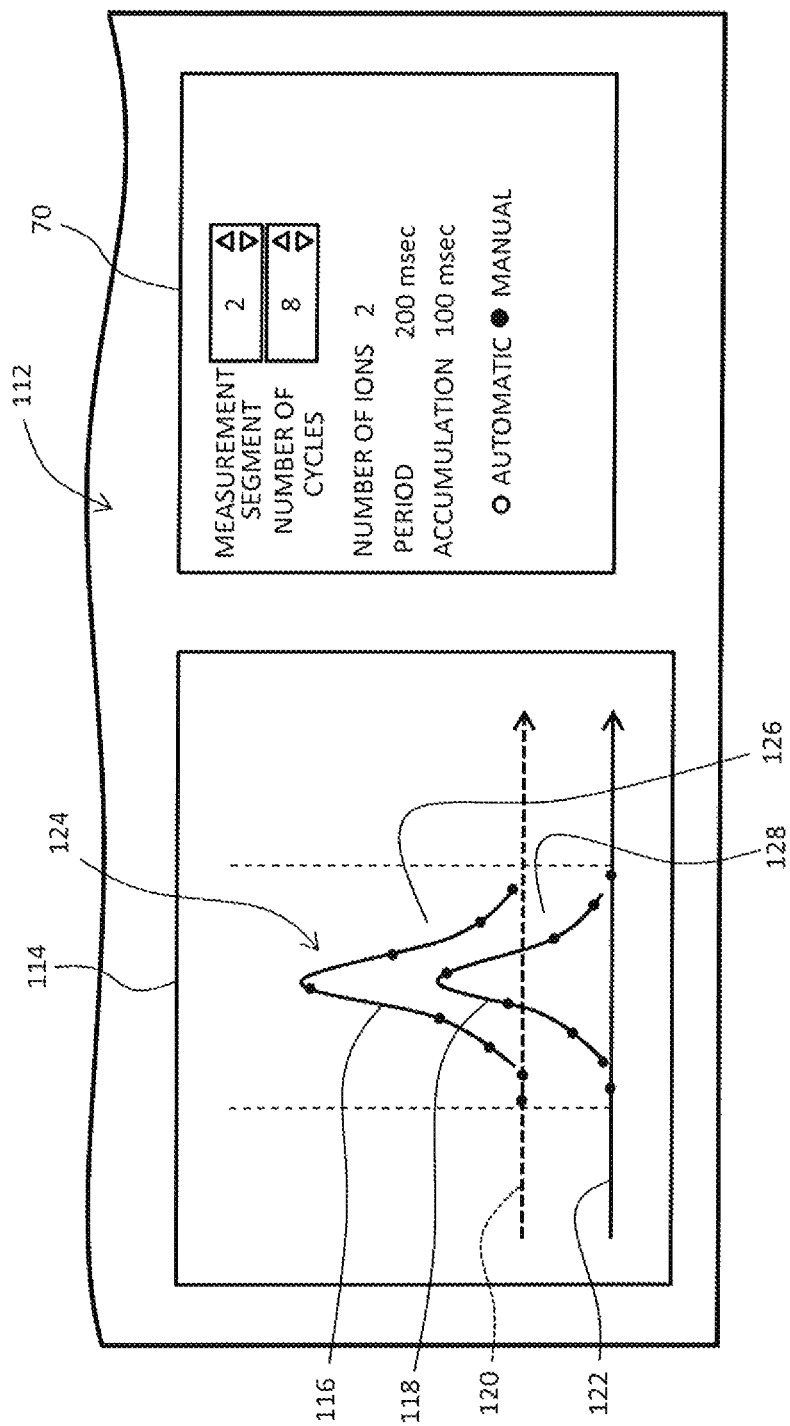
FIG. 8 is a diagram showing a fourth example display according to an embodiment of the present disclosure.

FIG. 8 shows a fourth example display. A review image 112 includes a waveform image 114 and the numerical value image 70. The waveform image 114 includes two waveform portions 116 and 118 which are two peaks observed for two ions. Specifically, in specifying a compound, when two ions derived from the compound are observed in a time divisional manner, a chromatogram may be drawn for each ion, and peaks occur in each chromatogram. These peaks are the waveform portions 116 and 118. In the example structure shown in the figure, different offsets are applied to the two waveform portions 116 and 118, and the display positions thereof are shifted in the vertical direction. Because of this, two time axes 120 and 122 are provided.

The waveform image 114 includes a marker array 124. The marker array 124 includes a sub-marker array 126 indicating a plurality of measurement points in the waveform portion 116, and a sub-marker array 128 indicating a plurality of measurement points in the waveform portion 118. The plurality of markers of the sub-marker array 126 and the plurality of markers of the sub-marker array 128 are shifted from each other by a half cycle in the time axis direction. For example, four peaks acquired for two compounds may be displayed along with the marker array.

In each of the example displays described above, the waveform image is generated using the chromatograph acquired by the in-advance measurement executed immediately prior to the main measurement. Alternatively, the waveform image may be generated using a chromatograph acquired by a measurement in a further past. In this case, desirably, there is used a chromatograph which is measured for the same or a similar combination as the combination of the analysis target compounds.

Figure 9:
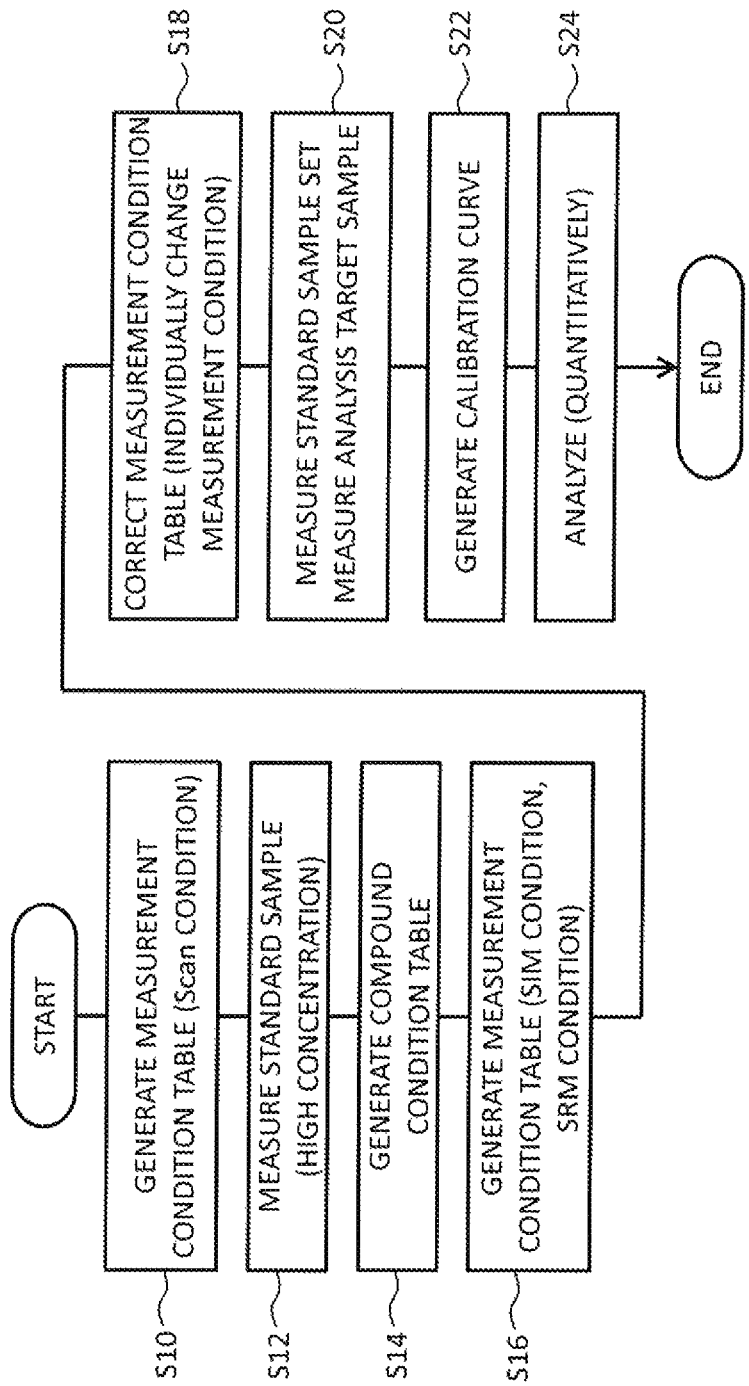
FIG. 9 is a flowchart showing an example operation.

FIG. 9 shows an operation of the chromatograph-mass spectrometry system (operation during quantitative analysis) as a flowchart. In the example structure shown in the figure, in S10, prior to a measurement of a standard sample of high concentration (scan measurement), a measurement condition table (scan condition) is generated. The operation mode during the in-advance measurement normally differs from the operation mode during the main measurement. In S12, a standard sample of high concentration (desirably, the highest concentration) is measured. In S14, the compound condition table is manually or automatically generated based on the measurement result of the standard sample of high concentration. For example, in the chromatogram acquired by the measurement of the standard sample of high concentration, a peak position (predicted retention time) and a peak range for each compound are manually or automatically determined. In S16, the measurement condition table is automatically generated based on the generated compound condition table.

In S18, the review image is displayed, the measurement condition is checked for each measurement segment through observation of the review image, and the measurement condition is corrected as necessary. As described above, the review image includes the waveform image and the numerical value image. Details of S18 will be described later with reference to FIG. 10.

In S20, measurement of the standard sample set is executed according to a plurality of (corrected) measurement conditions corresponding to the plurality of measurement segments, and then, measurement of the analysis target sample is executed. In this case, the same measurement condition is applied to the measurement of the standard sample set and the measurement of the analysis target sample. In S22, a calibration curve is generated for each compound which is the quantitative analysis target, based on the measurement result of the standard sample set. In S24, each individual compound is quantitatively analyzed based on the generated calibration curve and the measurement result of the analysis target sample.

Figure 10:
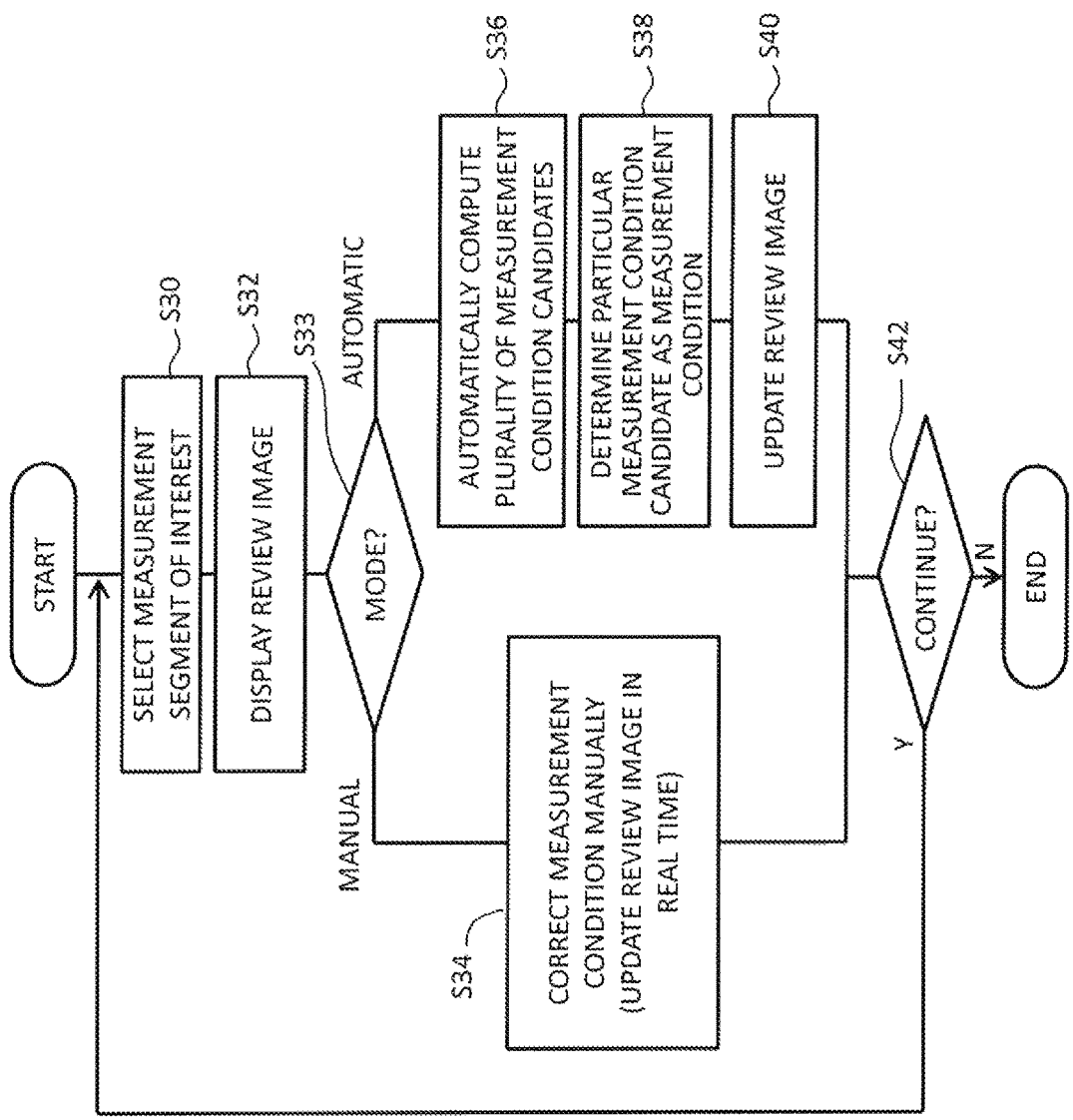
FIG. 10 is a flowchart showing a method of displaying a review image.

FIG. 10 shows as a flowchart content of S18 described above. In S30, the review image (a review image without a substantial content in a first-time execution of S30) is displayed, and, with an operation on the designation column included in the review image, the measurement segment of interest is selected. In S32, a review image with a substantial content is displayed; that is, a review image, showing the measurement condition which is set for the measurement segment of interest as the waveform information and the numerical value information, is displayed.

In S33, of a manual correction mode and an automatic correction mode, a mode selected by the user is judged. When the manual mode is selected, S34 is executed. In S34, by the observation of the review image, the user judges whether or not the number of cycles needs to be changed, and, when the change is judged necessary, the user actually changes the number of cycles on the review image. With this change, the other measurement conditions are computed in real time, and the changes are reflected in the review image in real time.

On the other hand, when it is judged in S33 that the user has selected the automatic setting mode, in S36, a plurality of measurement condition candidates are automatically computed under certain conditions, in S38 a particular measurement condition candidate is selected from among the plurality of measurement condition candidates, and the selected measurement condition candidate is actually set as the measurement condition. In S40, the measurement condition after the change is reflected in the review image in real time. In either of the manual change and the automatic change, the changed content can be checked through the waveform image. In other words, the operation condition after the change can be specifically recognized in relation to the actual waveform.

When it is judged in S42 that the checking of the measurement condition and the change are to be continued, the processes of S30 and later are repeatedly executed. When it is judged in S42 that the checking of the measurement condition and the change are completed, the present process is completed.

Figure 11:
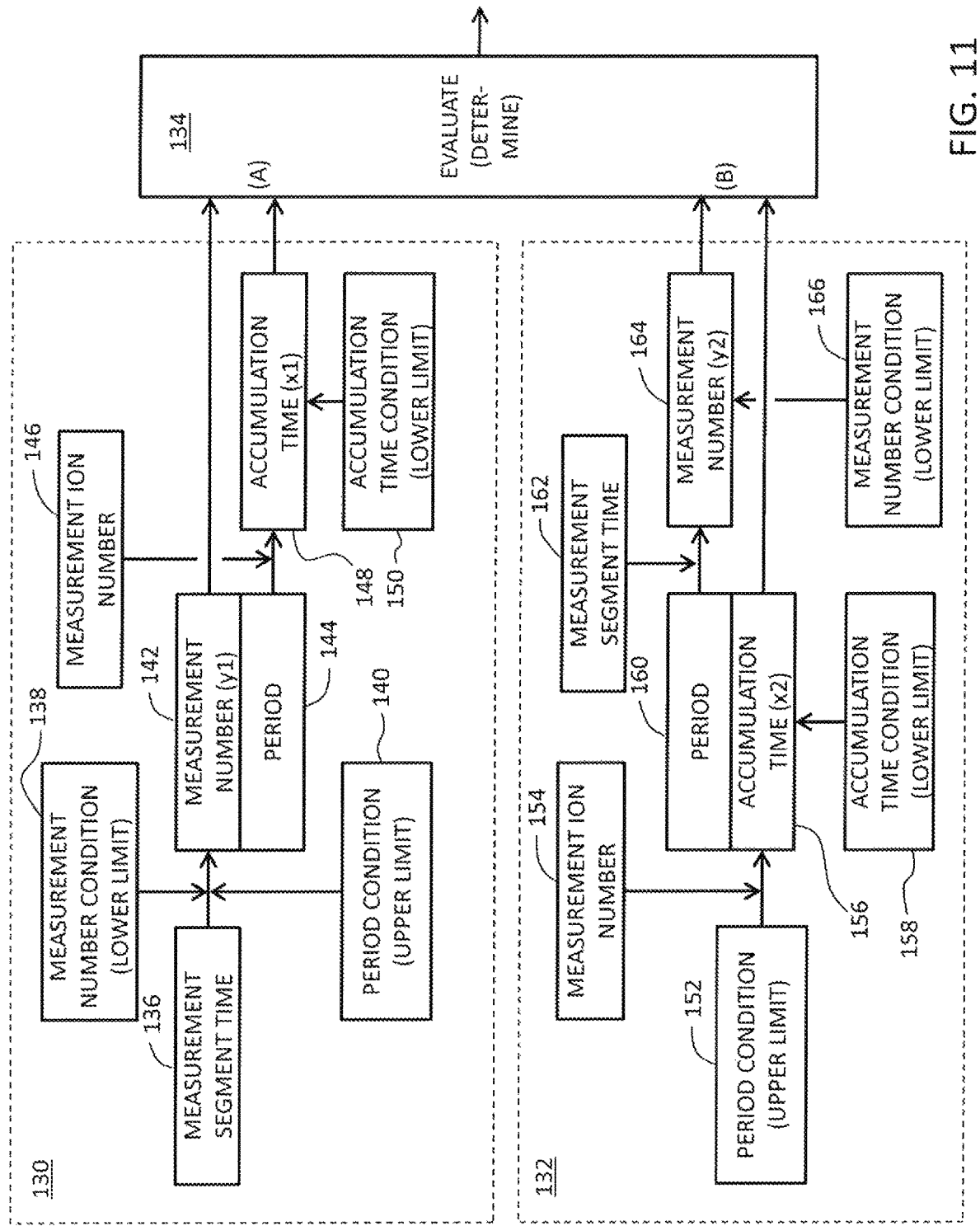
FIG. 11 is a conceptual diagram showing a computation method of a plurality of measurement condition candidates.

Next, with reference to FIG. 11, the computation in S36 described above and the determination in S38 described above will be described. Reference numerical 130 shows a first computation method and reference numeral 132 shows a second computation method.

In the first computation method 130, the number of measurements y1 (refer to reference numeral 142) is computed based on a measurement segment time (refer to reference numeral 136) so that a measurement number condition (measurement number lower limit) (refer to reference numeral 138) and a period condition (period upper limit) (refer to reference numeral 140) are satisfied. For example, there is computed a maximum y1 which satisfies a condition "measurement segment time/y1≤period upper limit." Here, the measurement number is the number of cycles, and the period is the cycle time. When the measurement number y1 is determined, the period (refer to reference numeral 144) is determined from the measurement segment time. When the period is divided by the measurement ion number (refer to reference numeral 146), the accumulation time x1 (refer to reference numeral 148) is determined. When the accumulation time x1 is shorter than the accumulation time condition (accumulation period lower limit), an error occurs. When any of the other conditions is not satisfied, an error occurs similarly.

For example, when the measurement number lower limit is 5 times, the measurement segment time is 4200 msec, and the period upper limit is 500 msec, the maximum y1 which satisfies the condition 4200/y1≤500 is 9. When 4200 msec is divided by 9, the period is determined, which is 466 msec. When the period is divided by the measurement ion number which is 3, the accumulation time x1 is determined, which is 155 msec. This time exceeds the accumulation time lower limit, which is 10 msec.

In the second computation method 132, first, the period upper limit (refer to reference numeral 152) is divided by the number of measurement ions (refer to reference numeral 154), to determine an accumulation time x2 (refer to reference numeral 156), and, at the same time, the period (refer to reference numeral 160) is determined. It is required that the accumulation time x2 exceeds the accumulation time lower limit (refer to reference numeral 158). The period is determined by multiplying the accumulation time x2 by the number of measurement ions. Next, the measurement segment time (refer to reference numeral 162) is divided by the period, to determine a measurement number y2 (refer to reference numeral 164). It is required that the measurement number y2 is not lower than the measurement number lower limit (refer to referenced numeral 166). When any of the conditions is not satisfied, an error occurs.

For example, under the above-described conditions, the period upper limit, 500 msec, is divided by the measurement ion number, which is 3, to determine the accumulation time, which is 166 msec. In this case, the period is determined by 166 msec times 3. The measurement segment time 4200 msec is divided by the period, to determine the number of "8" as the measurement number y2. This number is not lower than the measurement number lower limit described above.

In the above-described specific example, computation results (A) of the first computation method are: y1=9 and x1=155, and computation results (B) of the second computation method are: y2=8 and x2=166. These two measurement condition candidates are evaluated (compared to each other), and one of the measurement condition candidates is determined as the actual measurement condition (refer to reference numeral 134). For example, assuming that the measurement number is included in a predetermined range (for example, 8~10), a measurement condition candidate having a larger accumulation time is selected from the two measurement condition candidates. In the above-described specific example, the computation result (B) is selected.

Parameters other than y1, y2, x1, and x2 are specified as described above in the respective computation processes. Alternatively, a condition to be prioritized may be determined from the plurality of conditions, and the plurality of measurement condition candidates may be computed based thereon. Alternatively, a rule of the evaluation may be changeable or selectable.

Desirably, the accumulation time lower limit is changed according to the measurement mode. For example, the accumulation time lower limit may be set to 10 msec for the SIM mode, to 1 msec for a high-speed SRM mode, and to 10 msec for a high-sensitivity SRM mode.

According to the embodiment described above, because a plurality of display elements indicating the period of the circulating ion measurement are displayed along with the waveform portion, the appropriateness of the circulating ion measurement can be judged visually. That is, it is possible to easily judge, in relation to the specific form of the waveform portion, whether the number of circulating ion measurements is appropriate, too small, or too large.

The invention claimed is:

1. A chromatograph-mass spectrometry system comprising:
    a storage unit that stores a measurement condition table for managing a plurality of measurement segments which are set on a retention time axis, and a circulating ion measurement executed for each measurement segment;
    a review image generator that generates, based on the measurement condition table, a review image showing an ion measurement condition which is determined for a measurement segment of interest which is selected from among the plurality of measurement segments; and
    a display that displays the review image, wherein
    the review image comprises a waveform image; and the waveform image comprises a waveform portion in at least the measurement segment of interest of a chromatogram, and a plurality of display elements displayed along with the waveform portion and indicating a circulating ion measurement executed in the measurement segment of interest.

2. The chromatograph-mass spectrometry system according to claim 1, wherein
the plurality of display elements are a plurality of markers indicating a plurality of ion measurement timings.

3. The chromatograph-mass spectrometry system according to claim 1, wherein
the review image generator changes an arrangement of the plurality of display elements when an ion measurement condition determined for the measurement segment of interest is changed.

4. The chromatograph-mass spectrometry system according to claim 1, wherein
the review image includes a numerical value image, and
the numerical value image includes numerical value information indicating the number of cycles of the circulating ion measurement, numerical value information indicating a cycle time of the circulating ion measurement, and numerical value information indicating an accumulation time forming a measurement unit in the circulating ion measurement.

5. The chromatograph-mass spectrometry system according to claim 4, wherein
the numerical value image includes a column in which a user designates the number of cycles.

6. The chromatograph-mass spectrometry system according to claim 4, further comprising:
a determiner that determines a part or all of the number of cycles, the cycle time, and the accumulation time so that a cycle-number condition, a cycle time condition, and an accumulation time condition are satisfied, wherein
a determination result of the determiner is reflected in the numerical value image.

7. The chromatograph-mass spectrometry system according to claim 6, wherein
the determiner comprises:
a means which determines a plurality of ion measurement condition candidates which satisfy the three conditions including the cycle-number condition, the cycle time condition, and the accumulation time condition; and
a means which determines a particular ion measurement condition candidate as an ion measurement condition by evaluating the plurality of ion measurement condition candidates.

8. The chromatograph-mass spectrometry system according to claim 1, wherein
the chromatogram is a standard sample chromatogram acquired by measurement of a standard sample, and
measurement of an analysis target sample is executed after checking and changing the ion measurement condition through observation of the review image.

9. A method of displaying a measurement condition, comprising:
generating, based on a measurement condition table for managing a plurality of measurement segments which are set on a retention time axis, and a circulating ion measurement executed for each measurement segment, a review image for checking and changing an ion measurement condition which is determined for a measurement segment of interest which is selected from among the plurality of measurement segments; and
displaying the review image, wherein
the review image includes a waveform image and a numerical value image,
the waveform image includes a waveform portion in at least the measurement segment of interest of a chromatograph, and a plurality of display elements displayed along with the waveform portion and indicating a circulating ion measurement executed in the measurement segment of interest, and
the numerical value image includes at least one of numerical value information indicating the number of cycles of the circulating ion measurement, numerical value information indicating a cycle time of the circulating ion measurement, and numerical value information indicating an accumulation time forming a measurement unit in the circulating ion measurement.

\* \* \* \* \*